(12) United States Patent
Krummell et al.

(10) Patent No.: US 8,672,148 B2
(45) Date of Patent: Mar. 18, 2014

(54) LOW PROFILE PUSH-BACK CART AND PUSH-BACK CART STORAGE SYSTEM

(75) Inventors: John Krummell, Long Beach, CA (US); Kenneth Davison, Palos Verdes Estates, CA (US)

(73) Assignee: J.C.M. Industries, Inc., Huntington Beach, CA (US)

( * ) Notice: Subject to any disclaimer, the term of this patent is extended or adjusted under 35 U.S.C. 154(b) by 282 days.

(21) Appl. No.: 12/949,658

(22) Filed: Nov. 18, 2010

(65) Prior Publication Data

US 2012/0125874 A1 May 24, 2012

(51) Int. Cl.
| | | |
|---|---|---|
| B65G 1/06 | (2006.01) |
| A47B 46/00 | (2006.01) |
| A47B 53/00 | (2006.01) |
| B65G 1/02 | (2006.01) |
| A47B 47/02 | (2006.01) |

(52) U.S. Cl.
CPC *B65G 1/026* (2013.01); *B65G 1/06* (2013.01); *A47B 46/00* (2013.01); *A47B 47/021* (2013.01); *A47B 53/00* (2013.01)
USPC .......................................... 211/151; 211/162

(58) Field of Classification Search
USPC .................... 211/151, 126.15, 191, 162, 59.2; 414/276, 286, 233, 235; 193/35 R, 193/35 TE; 312/281, 198–201
See application file for complete search history.

(56) References Cited

U.S. PATENT DOCUMENTS

| | | | | |
|---|---|---|---|---|
| 4,341,313 | A | * | 7/1982 | Doring ........................ 211/151 |
| 4,462,500 | A | | 7/1984 | Konstant et al. |
| 4,613,270 | A | | 9/1986 | Konstant et al. |
| 4,773,546 | A | * | 9/1988 | Konstant ...................... 211/151 |
| 4,915,240 | A | | 4/1990 | Konstant |
| 4,982,851 | A | | 1/1991 | Konstant |
| 5,080,241 | A | | 1/1992 | Konstant |
| 5,180,069 | A | | 1/1993 | Krummell et al. |
| 5,203,464 | A | * | 4/1993 | Allen ............................ 211/151 |
| 5,328,038 | A | * | 7/1994 | Allen ............................ 211/151 |
| 5,415,300 | A | | 5/1995 | Krummell et al. |
| 5,419,444 | A | * | 5/1995 | Strom .......................... 211/151 |
| 5,482,422 | A | * | 1/1996 | Hammond ................... 414/276 |
| 5,524,776 | A | * | 6/1996 | Hall et al. .................... 211/151 |
| 6,129,223 | A | | 10/2000 | Krummell et al. |
| 6,158,943 | A | | 12/2000 | Sullivan |
| 6,851,562 | B2 | * | 2/2005 | Gorniak et al. .............. 211/59.2 |
| 7,140,503 | B2 | | 11/2006 | Krummell, Jr. et al. |
| 2007/0193190 | A1 | | 8/2007 | Konstant |

* cited by examiner

*Primary Examiner* — Jennifer E Novosad
(74) *Attorney, Agent, or Firm* — Perkins Coie LLP; Kenneth H. Ohriner

(57) ABSTRACT

A push-back cart storage system has one or more push-back carts having a cross-member formed by a structural angle section having cutouts at opposite ends to provide clearance for the second push-back cart to move under the first push-back cart. The cross member provides a truss or joist type of beam support having a full height middle section which resists bending and a reduced height at the ends, to provide a low profile. Side members or angle sections on the cart have through holes for attaching wheels, with no welding of wheel mounts required.

16 Claims, 5 Drawing Sheets

LOW PROFILE PUSH-BACK CART AND PUSH-BACK CART STORAGE SYSTEM

BACKGROUND OF THE INVENTION

Push-back cart storage systems use rolling carts for carrying pallets. By providing several carts on a set of rails, usable space between aisles in a warehouse is increased, since multiple pallets can be stored and retrieved from a single aisle. Consequently, aisle space necessary in conventional storage racks for forklift access may instead be used for additional storage racks, providing more efficient use of space.

In a push-back storage system, the each cart must sequentially fit under the next cart, from the front to the back of the rack. Consequently, in systems having multiple carts in a single lane, such as with three, four, five or six deep cart systems, the height of the highest cart necessary to accommodate the underlying carts may be substantial. Specifically, the highest cart must be high enough to accommodate all other carts underneath it. The height of the highest cart determines the vertical clearance required for each lane. As several lanes of storage are stacked vertically, the cart height contributes to the total vertical height of the rack system. Since the available vertical clearance in the warehouse may be limited, cart height can become a significant factor. The carts may carry in excess of 3000 lbs of goods on a pallet. Consequently, the carts must have sufficient structural strength to resist heavy loading. On the other hand, it is advantageous to simplify the construction of the carts to reduce manufacturing costs and to improve the overall system value.

Accordingly, engineering challenges remain in the design of push-back cart storage systems.

It is therefore an object of the invention to provide an improved push-back cart storage system. Other and further objects and advantages will appear hereinafter.

BRIEF DESCRIPTION OF THE DRAWINGS

In the drawings, the same reference number indicates the same element in each of the views.

DETAILED DESCRIPTION OF THE DRAWINGS

Figure 1:
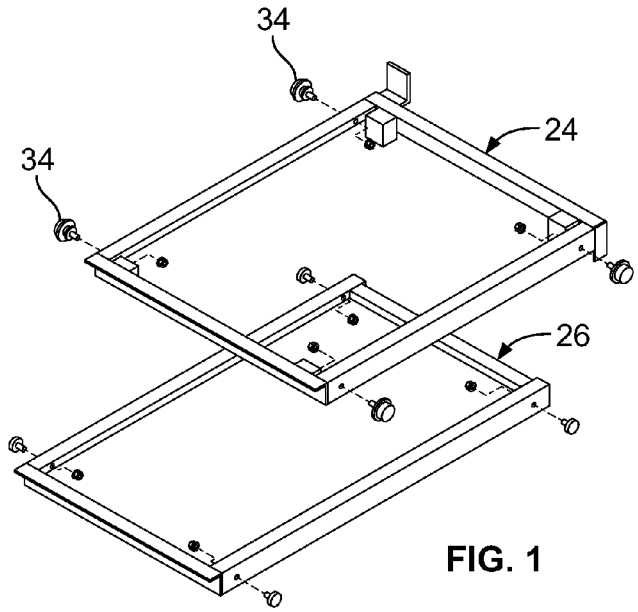
FIG. 1 is an exploded perspective view of first and second carts for use in a push-back storage system.
Figure 2:
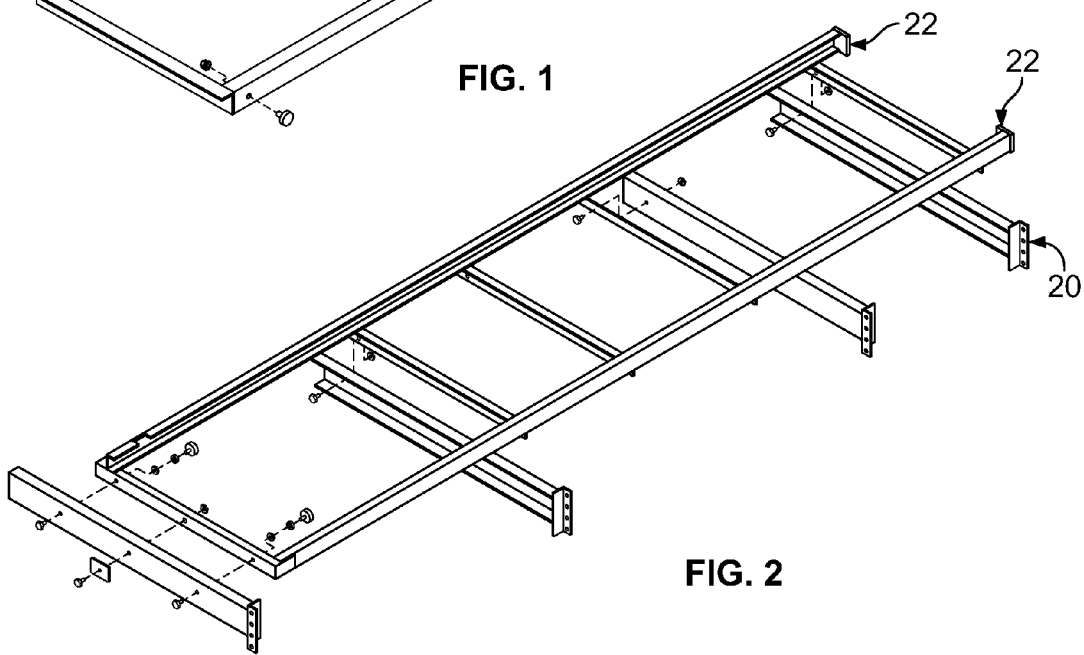
FIG. 2 is a perspective view of a three-deep push-back system.

As shown in FIGS. 1 and 2, in a push-back storage system, push-back rails 22 are supported on a rack 20, as described, for example, in U.S. Pat. Nos. 5,180,069, 5,415,300 and 6,129,223, incorporated herein by reference. FIGS. 1 and 2 show a three-deep system having a first or top cart 24 and second or bottom cart 26. Due to the typical 3000 pound cart load specification, the cross members in prior art carts have been formed using a 3×2 inch steel angle section, i.e., an angle or "L" section having a three inch height and a two inch width, or using tube sections. Tube sections add substantial manufacturing cost in comparison to angle sections. However, use of a typical angle section, such as a 3×2 angle, requires that each cart have a minimum height of three inches. The height of each cart contributes to the overall height occupied by the push-back storage system. Consequently, each additional inch of cart height reduces the available vertical clearance for pallets. This factor then limits the number of vertically stacked lanes that can be installed in height limited facility, and/or requires that the rack have a greater height.

Figure 3:
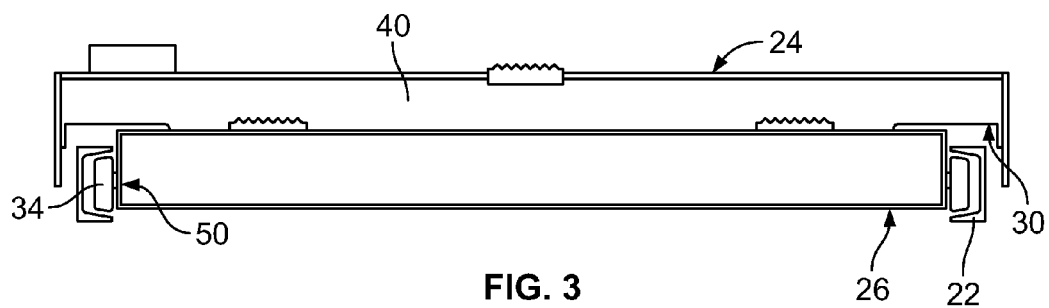
FIG. 3 is a front view of the carts shown in FIG. 1.
Figure 4:
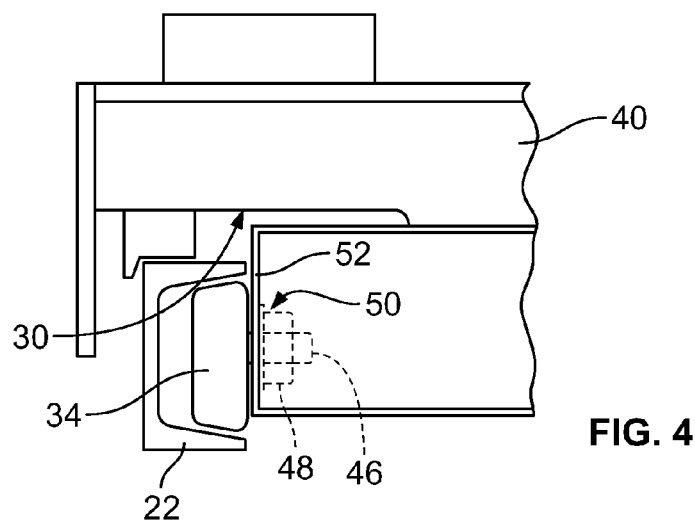
FIG. 4 is an enlarged detail of the carts shown in FIG. 3.

Turning to FIGS. 3-6 and 10, the front angle section or member 40 of the first cart 24 has side cutouts 30. The cutouts provide a joist or truss type of construction on the front angle section 40 of the cart 24. This provides a low-profile design requiring reduced vertical clearance or stack height, while still providing a high strength front lateral member for the cart. The cutouts 30 allow the cart to sit inside of the cart below. Also as shown in FIGS. 3 and 4, the push-back rails 22 are structural steel C-channel sections, which reduce material cost, in contrast to tube sections. As one example, in the design shown in FIGS. 3-6 and 10, a 3×2×3/16 steel angle may be used, instead of a 3×2 tube, without reducing the payload specification.

Figure 9:
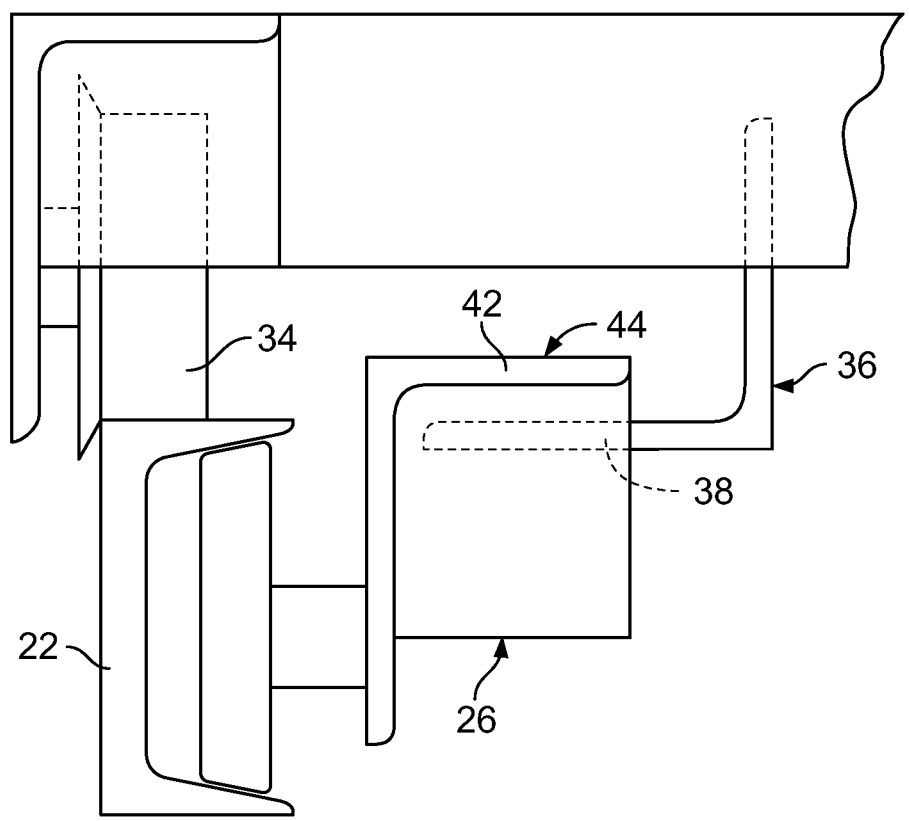
FIG. 9 is an enlarged front section view of the capture section shown in FIG. 7 engaged with the first or lower cart shown in FIGS. 1 and 3.
Figure 10:
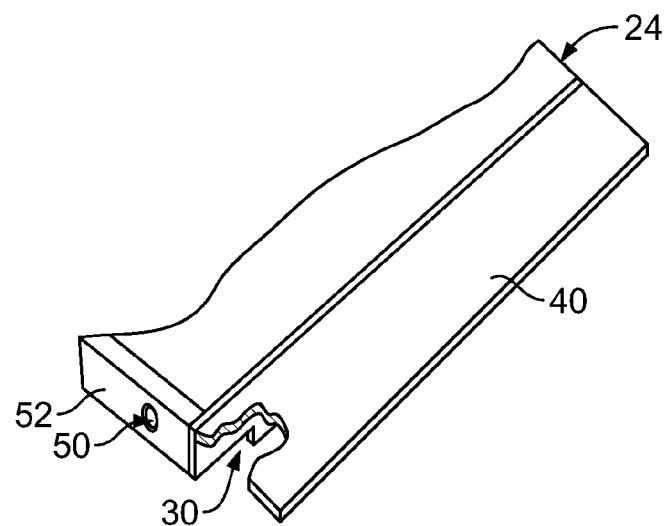
FIG. 10 is a partial perspective view of the front angle section of the top cart shown in FIGS. 1 and 3.

As shown in FIGS. 3 and 9, the first cart 24 rolls over the second cart 26, and not on the side members of the second cart 26, as in U.S. Pat. No. 5,414,300, for example. The top cart 24 may also be constructed entirely from structural angle sections, rather than tube sections.

Figure 5:
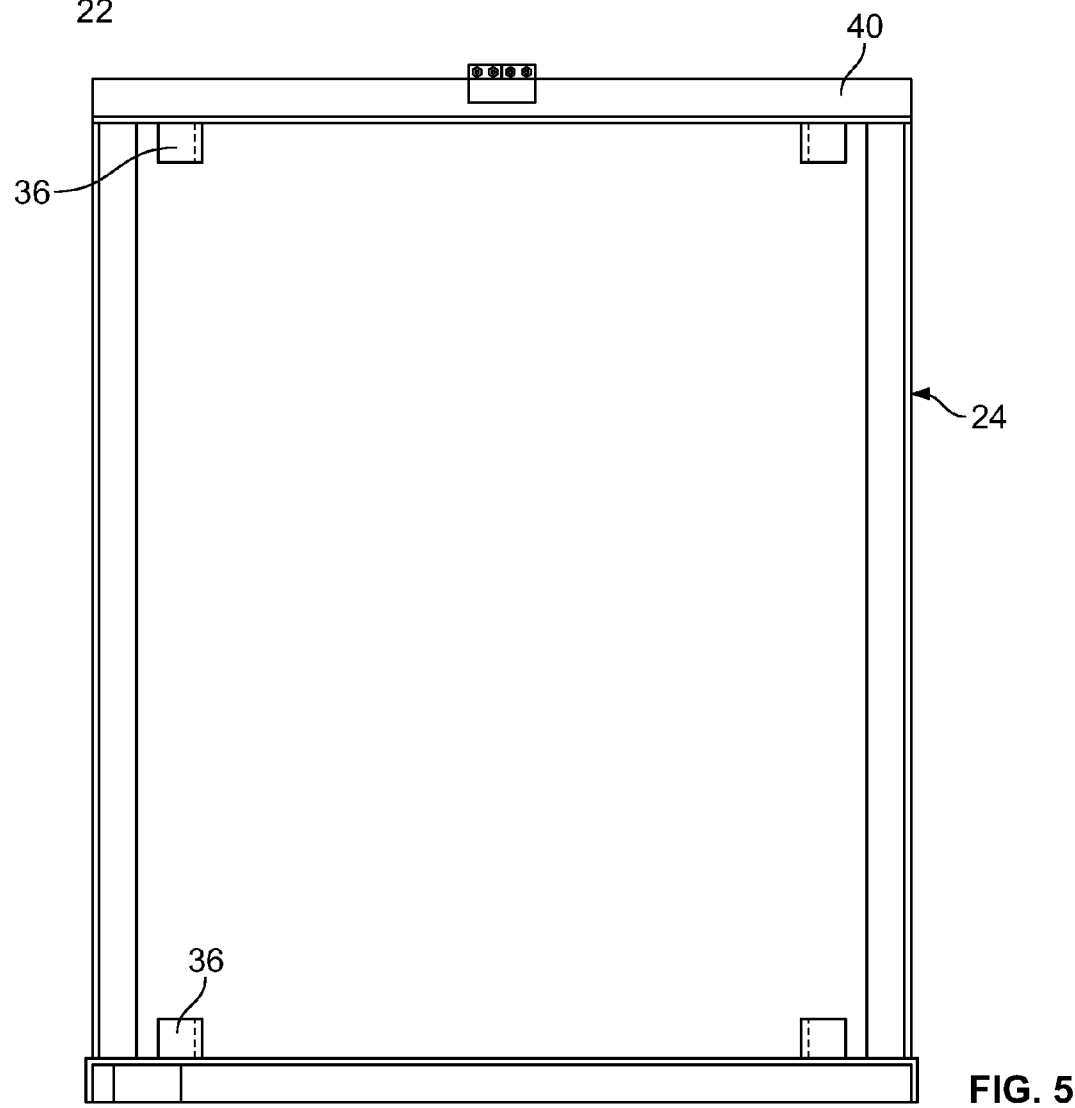
FIG. 5 is a bottom view looking up of the first or top cart shown in FIGS. 1 and 3.
Figure 6:
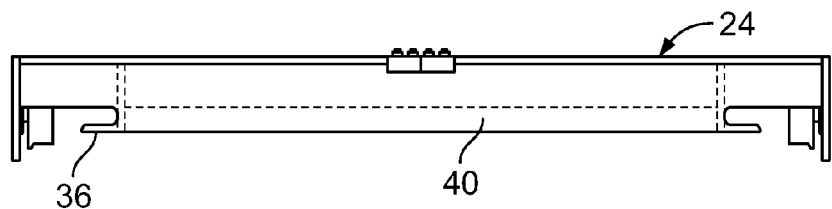
FIG. 6 is a front rotated view of the cart shown in FIG. 5.
Figure 7:
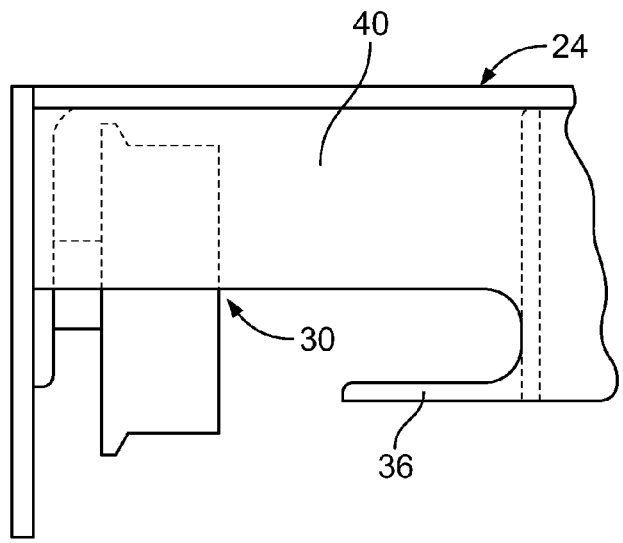
FIG. 7 is an enlarge detail of the capture section of an alternative cart design.
Figure 8:
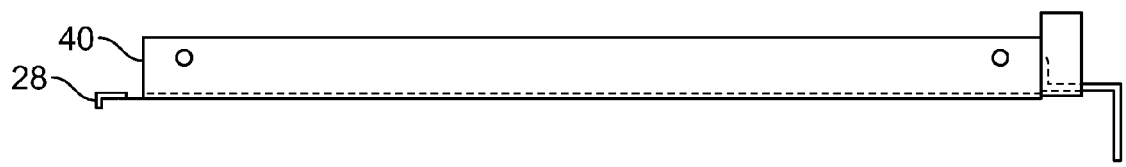
FIG. 8 is an inverted side view of the cart shown in FIG. 5.

As shown in FIGS. 5, 7 and 9, the top cart 24 has capture sections 36 generally adjacent to each corner of the cart. The capture sections 36 are short segments (for example 2-6 inches) of structural steel angle attached to and extending down from the top cart 24. As shown in FIG. 9, the outwardly projecting flange 38 of each of the capture sections 36 extends under the second or bottom cart 26. Specifically, as shown in FIG. 9, the flange 38 extends underneath the top flange 42 of the side angle section 44 of the second cart 26. As a result, the top cart 24 is captivated vertically by the bottom cart 26. The bottom cart 26 is captivated vertically via the wheels 34 positioned within the recess in the push-back rails 22. As a result, the carts 24 and 26 cannot be lifted off of the rails or each other. This prevents inadvertent cart lift off and misalignment during loading and unloading via a fork-lift truck. This cart capturing design avoids any components welded onto the rails 22, significantly lowering manufacturing costs.

Figure 11:
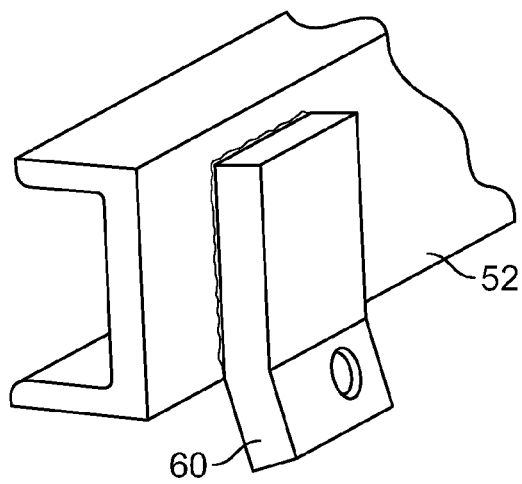
FIG. 11 is a detail perspective view of prior art wheel mounts welded onto a side member of a push-back cart.
Figure 12:
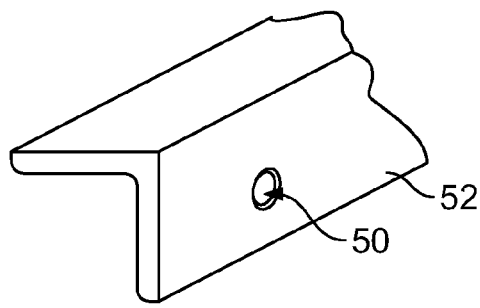
FIG. 12 is a detail perspective view a new wheel mount for a push-back cart.

FIG. 11 shows a prior art design having a wheel mount 60 welded onto a side member 52 of a push back cart. FIG. 12 shows an improved design having a hole 50 punched, drilled, or otherwise formed in the side member 52. The design in FIG. 12 avoids the need for manufacturing the wheel mount 60 and for welding the wheel mount 60 onto the cart. No welded on wheel mounts are needed. This results in cost savings in manufacturing the carts, since each cart has four wheels, and push-back rack storage systems can require hundreds or thousands of carts. As shown in FIG. 4, wheels 34 can mounted onto the side members 52 of the carts via a wheel axle 46 extending through the hole 50 in the side member 52, with the axle held in place with a nut 48 or other fastener. In prior art designs, at least one cart has typically required use of wheel mounts 60.

Thus, a novel push-back storage system and cart design have been shown and described. Various changes and substitutions can of course be made without departing from the spirit and scope of the invention. The invention, therefore, should not be limited, except by the following claims, and their equivalents.

The invention claimed is:

1. A push-back cart storage system, comprising:
   a rack;
   a pair of spaced apart push-back rails supported on the rack;
   first and second push-back carts having wheels rolling on the push-back rails;
   the first push-back cart having a front cross-member comprising an angle section having cutouts at opposite ends of the cross-member and with a central section of the front cross member positioned below a top surface of the second push-back cart to provide clearance for the second push-back cart to move under the first push-back cart.

2. The push-back cart storage system of claim 1 with the first push-back cart having left and right side members joined to opposite ends of the cross-member, and with the cutouts adjacent respectively to the left and right side members of the first push-back cart.

3. The push-back cart storage system of claim 2 further comprising front and rear axle holes provided in the left and right side members, and with a wheel attached to the first push-back at each axle hole via an axle extending through each axle hole.

4. The push-back cart storage system of claim 1 with the first and second carts each including four wheels, and with each of the wheels attached directly to a side member of the first and second carts without a wheel mount welded to the cart.

5. The push-back cart storage system of claim 1 further including a rear cross-member comprising an angle section having cutouts at opposite ends of the rear cross-member.

6. The push-back cart storage system of claim 1 with the first cart constructed entirely from structural angle sections.

7. The push-back cart storage system of claim 1 with the first cart captivated to the second cart without any component welded onto the rails.

8. The push-back cart storage system of claim 1 with the first cart captivated to the second cart without any component welded onto the second cart.

9. The push-back cart storage system of claim 1 with the first cart captivated to the second cart without any separate captivation component provided on the second cart.

10. The push-back cart storage system of claim 1 further comprising left and right capture sections on the first cart extending underneath a part of the second cart, to captivate the first cart onto the second cart.

11. The push-back cart storage system of claim 10 with the left and right capture sections extending underneath a top flange of a side angle section of the second cart.

12. A push-back cart storage system, comprising:
    a rack;
    a pair of spaced apart push-back rails supported on the rack;
    first and second push-back carts having wheels rolling on or in the push-back rails;
    the first push-back cart having a front cross-member comprising an angle section having cutouts at opposite ends of the front cross-member, to provide clearance for the second push-back cart to move under the first push-back cart;
    the first push-back cart having left and right side members joined to opposite ends of the front cross-member, with the cutouts adjacent respectively to the left and right side members, and front and rear axle holes in the left and right side members; and
    a wheel attached to the first push-back cart at each axle hole via an axle extending through each axle hole.

13. The push-back cart storage system of claim 12 further comprising a rear cross-member on the first push-back cart having an angle section with cutouts at opposite ends of the rear cross-member to provide clearance for the second push-back cart to move under the first push-back cart.

14. The push-back cart storage system of claim 12 with the first cart captivated to the second cart without any component welded onto the second cart.

15. The push-back cart storage system of claim 12 further comprising left and right capture sections on the first cart extending underneath a top flange of a side angle section of the second cart.

16. A push-back cart storage system, comprising:
    a rack;
    a pair of spaced apart push-back rails supported on the rack;
    first and second push-back carts having wheels rolling on or in the push-back rails;
    the first push-back cart having a front cross-member comprising an angle section having cutouts at opposite ends of the front cross-member, to provide clearance for the second push-back cart to move under the first push-back cart; and
    with the first and second carts each including four wheels, and with each of the wheels attached directly to a side member of the first and second carts without a wheel mount welded to the cart.

* * * * *